(12) United States Patent
Yelton

(10) Patent No.: US 11,238,574 B2
(45) Date of Patent: *Feb. 1, 2022

(54) LOW-LATENCY AUGMENTED CONTRAST LIMITED ADAPTIVE HISTOGRAM EQUALIZATION

(71) Applicant: The Boeing Company, Chicago, IL (US)

(72) Inventor: Dennis Yelton, Chicago, IL (US)

(73) Assignee: The Boeing Company, Chicago, IL (US)

( * ) Notice: Subject to any disclaimer, the term of this patent is extended or adjusted under 35 U.S.C. 154(b) by 130 days.

This patent is subject to a terminal disclaimer.

(21) Appl. No.: 16/536,513

(22) Filed: Aug. 9, 2019

(65) Prior Publication Data
US 2021/0042894 A1 Feb. 11, 2021

(51) Int. Cl.
| | | |
|---|---|---|
| G06T 5/40 | (2006.01) |
| H04N 13/204 | (2018.01) |
| G06T 5/20 | (2006.01) |
| G06T 5/00 | (2006.01) |
| B64D 39/00 | (2006.01) |
| B64D 47/08 | (2006.01) |

(Continued)

(52) U.S. Cl.
CPC .............. G06T 5/40 (2013.01); B64D 39/00 (2013.01); B64D 45/0005 (2013.01); B64D 47/08 (2013.01); G06T 5/003 (2013.01); G06T 5/007 (2013.01); G06T 5/20 (2013.01); G06T 7/97 (2017.01); H04N 13/204 (2018.05); G06T 2207/10021 (2013.01); G06T 2210/52 (2013.01)

(58) Field of Classification Search
None
See application file for complete search history.

(56) References Cited

U.S. PATENT DOCUMENTS

| | | | | |
|---|---|---|---|---|
| 7,840,066 B1 * | 11/2010 | Chen | ........................ | G06T 5/40 |
| | | | | 382/168 |
| 9,418,408 B1 * | 8/2016 | Thompson | ............... | G09G 5/10 |
| 10,013,764 B2 * | 7/2018 | Atanassov | .............. | G06T 7/593 |

(Continued)

OTHER PUBLICATIONS

Sun, Yongbin, and Haibin Duan. "Pigeon-inspired optimization and lateral inhibition for image matching of autonomous aerial refueling." Proceedings of the Institution of Mechanical Engineers, Part G: Journal of Aerospace Engineering 232.8 (2018): 1571-1583. (Year: 2018).*

(Continued)

Primary Examiner — Andrae S Allison
(74) Attorney, Agent, or Firm — McDonnell Boehnen Hulbert & Berghoff LLP

(57) ABSTRACT

The present disclosure relates to imaging processing devices, aerial refueling aircraft, and methods relating to the processing of images. An example imaging processing device includes a programmable circuit, such as a field-programmable gate array (FPGA), that is reprogrammed based on selected circuit data so as to construct a circuit configured to provide image processing on at least one image. The image processing includes receiving the at least one image. The image processing also includes adjusting the at least one image, to provide at least one adjusted image. Adjusting the at least one image includes applying: a local adaptive histogram equalization filter, a global gamma correction filter, and a local contrast filter.

20 Claims, 13 Drawing Sheets

(51) Int. Cl.
  *B64D 45/00* (2006.01)
  *G06T 7/00* (2017.01)

(56) References Cited

U.S. PATENT DOCUMENTS

2006/0238441 A1* 10/2006 Benjamin ............ H04N 13/332
  345/8
2011/0052059 A1* 3/2011 Mathew .................... G06T 5/40
  382/168
2015/0178564 A1* 6/2015 Yokono .............. G06K 9/00382
  382/159

OTHER PUBLICATIONS

Chang, Yakun, et al. "Automatic contrast-limited adaptive histogram equalization with dual gamma correction." IEEE Access 6 (2018): 11782-11792. (Year: 2018).*

Parsons, C. and Scott Nykl. "Real-Time Automated Aerial Refueling Using Stereo Vision." ISVC (2016). (Year: 2016).*

Reza, Ali M. "Realization of the contrast limited adaptive histogram equalization (CLAHE) for real-time image enhancement." Journal of VLSI signal processing systems for signal, image and video technology 38.1 (2004): 35-44., (Year: 2004).*

Xu, Yan, et al. "On-board visual navigation system for unmanned aerial vehicles autonomous aerial refueling." Proceedings of the Institution of Mechanical Engineers, PartG: Journal of Aerospace Engineering 233.4 (2019): 1193-1203. (Year: 2019).*

Kokufuta et al., "Real-time processing of contrast limited adaptive histogram equalization on FPGA," 2010 International Conference on Field Programmable Logic and Applications, 2010, pp. 155-158 (IEEE Computer Society).

Zuiderveld, Karel, "Constant Limited Adaptive Histogram Equalization," Graphics Gems IV, 1994, pp. 474-485 (Edited by Paul S. Heckbert).

* cited by examiner

LOW-LATENCY AUGMENTED CONTRAST LIMITED ADAPTIVE HISTOGRAM EQUALIZATION

FIELD

The present disclosure relates to systems and methods for enhancing video images, particularly in the context of aerial refueling (e.g., in-air tanker aircraft).

BACKGROUND

Aerial refueling can be performed by a tanker aircraft by way of a refueling boom. In some instances, the boom could include a plurality of flight control surfaces to move the fuel probe of the boom so as to mate with a fuel nozzle of a receiving aircraft.

A conventional solution is to define twenty image scenes that adjust the contrast based on image statistics taken over a wide portion of an overall image captured by an image capture system of the tanker aircraft. For each scene, pre-defined maximum and minimum histogram limits over a third or more of the image are stretched to fill the entire dynamic range and then additional differential contrast stretching or compression is applied across the dynamic range globally over the entire image. Frequently, one or more of these twenty scenes provide good viewing results, but there are many cases where the contrast in the processed images is still too poor for aerial refueling operators (AROs) to conduct the refueling task.

SUMMARY

In an aspect, a method for processing images is described. The method includes receiving, at a programmable circuit, at least one image. The method also includes adjusting the at least one image, by the programmable circuit, to provide at least one adjusted image. Adjusting the at least one image includes applying: a local adaptive histogram equalization filter, a global gamma correction filter, and a local contrast filter.

In another aspect, an aerial refueling aircraft is provided. The aerial refueling aircraft includes a display and a programmable circuit configured to provide image data to the display. The programmable circuit includes at least one processor and a memory. The programmable circuit carries out operations including receiving, by the programmable circuit, at least one image and adjusting the at least one image, by the programmable circuit, to provide at least one adjusted image. Adjusting the at least one image includes applying: a local adaptive histogram equalization filter, a global gamma correction filter, and a local contrast filter.

In another aspect, an imaging processing device is described. The image processing device includes a programmable circuit that is reprogrammed based on selected circuit data so as to construct a circuit configured to provide image processing on at least one image. The image processing includes receiving the at least one image and adjusting the at least one image, to provide at least one adjusted image. Adjusting the at least one image includes applying: a local adaptive histogram equalization filter, a global gamma correction filter, and a local contrast filter.

Other aspects, examples, and implementations will become apparent to those of ordinary skill in the art by reading the following detailed description with reference, where appropriate, to the accompanying drawings.

BRIEF DESCRIPTION OF THE FIGURES

The novel features believed characteristic of the illustrative examples are set forth in the appended claims. The illustrative examples, however, as well as a preferred mode of use, further objectives and descriptions thereof, will best be understood by reference to the following detailed description of an illustrative example of the present disclosure when read in conjunction with the accompanying drawings, wherein:

DETAILED DESCRIPTION

I. Overview

Figure 1:
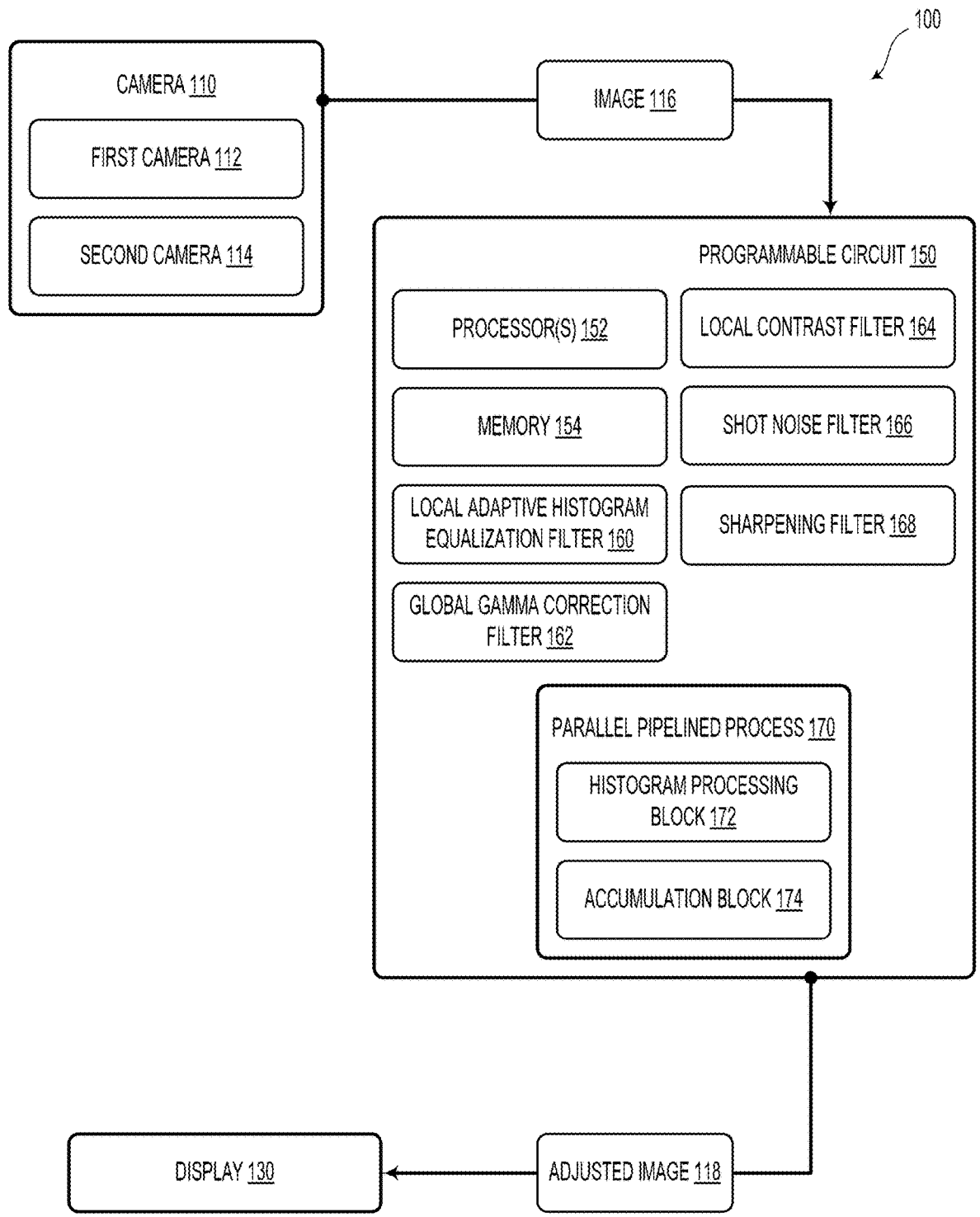
FIG. 1 illustrates an imaging processing device, according to an example implementation.

Example methods, devices, and systems are described herein. It should be understood that the words "example" and "exemplary" are used herein to mean "serving as an example, instance, or illustration." Any example or feature described herein as being an "example" or "exemplary" is not necessarily to be construed as preferred or advantageous over other examples or features. Other examples can be utilized, and other changes can be made, without departing from the scope of the subject matter presented herein.

Thus, the examples described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall examples, with the understanding that not all illustrated features are necessary for each example.

In the present disclosure, an improved image enhancement system and method may help a refueling operator to have a better visual representation of the approaching airplane during refueling operations. Some embodiments described herein may include methods that combine a variety of conventional and unconventional image processing techniques. For example, some portions of the image may be adjusted according to a contrast enhancement that is specifically performed in view of improving the visibility and clarity of certain sensitive aircraft features. Such image processing systems and methods may greatly enhance image quality over a wide range of lighting conditions for both visible and long wavelength infrared (LWIR) imagery. The approach has received positive endorsements by actual AROs.

The presently described technique combines local image processing techniques and global image processing techniques to greatly improve the overall image quality. In some embodiments, the processing technique could include contrast limited adaptive histogram equalization (CLAHE) and gamma correction. CLAHE is a local image processing technique and gamma correction is a global image processing technique.

CLAHE splits an image into tiles and performs contrast limited histogram equalization on each tile. The output value for any pixel is determined by a bilinear interpolation of the contrast limited histograms of the four nearest tiles (e.g., the two nearest tiles at the image edges and just the nearest tile at the image corners). Performing contrast limited histogram equalization on relatively small image tiles adjusts the contrast enhancement to suit local scene statistics and using bilinear interpolation of the histograms has the effect of blending the tiles together seamlessly.

Gamma correction globally stretches or compresses contrast across the full data dynamic range using a power law. It can be performed either before or after CLAHE, though applying gamma correction before CLAHE tends to produce the very best results.

Additionally, shot noise filtering can be applied before or after CLAHE to reduce noise in the imagery.

Likewise, a sharpening filter can be applied before or after CLAHE to make key aircraft features more distinct. Moreover, the contrast of characteristic features like the TACAN antenna can be further enhanced before or after CLAHE using a new targeted contrast enhancement filter. The filter is a rectangular convolution kernel that is first applied horizontally, transposed, and then applied vertically. For a feature that is 3 pixels wide or tall, the convolution kernel is:

| | | | | | | | | |
|---|---|---|---|---|---|---|---|---|
| −1.0; | −1.0; | −1.0; | 2 + 2/C; | 2 + 2/C; | 2 + 2/C; | −1.0; | −1.0; | −1.0 |
| −1.0; | −1.0; | −1.0; | 2 + 2/C; | 2 + 2/C; | 2 + 2/C; | −1.0; | −1.0; | −1.0 |
| −1.0; | −1.0; | −1.0; | 2 + 2/C; | 2 + 2/C; | 2 + 2/C; | −1.0; | −1.0; | −1.0 | where C is a number ranging from 1 to 2. In many cases, C=1 works very well.

This convolution kernel is normalized by multiplying it by C/18 before applying the convolution.

In some conventional approaches, implementation of the CLAHE process may be too computationally intensive for a programmable circuit, such as a field-programmable gate array (FPGA) device. However, the methods and systems described herein can be applied using FPGA devices and the like (e.g., application-specific integrated circuits (ASICs) or other types of parallel pipelined processors). For example, systems and methods disclosed herein provide a pipelined CLAHE process to allow for implementation and optimization on a parallel pipelined processor. In such scenarios, the parallel pipelined implementation of the method can execute the image adjustment functionality with very low frame latency (e.g., providing stereoscopic HD-quality video), which is desired for safe and accurate control of the refueling boom.

The present disclosure includes image processing techniques that may provide image enhancement for images of scenes that include stark contrast variations over short or long image distances. For example, the systems and methods described herein may be applied to many applications where human perception of subtle variations of image contrast is important.

II. Example Imaging Processing Device

FIG. 1 illustrates an image processing device 100, according to an example implementation. The image processing device 100 includes a programmable circuit 150 that is reprogrammed based on selected circuit data so as to construct a circuit configured to provide image processing on at least one image 116.

In some embodiments, the programmable circuit 150 could include at least one processor 152 and a memory 154. The at least one processor 152 may include, for instance, a field-programmable gate array (FPGA), an application-specific integrated circuit (ASIC), or another type of parallel pipelined processor. Other types of processors, circuits, computers, or electronic devices configured to carry out software instructions are contemplated herein. In some embodiments, the programmable circuit 150 could be configured to communicatively interact with a graphical user interface (GUI). For example, the GUI could provide a way for a user (e.g., an aerial refueling operator (ARO)) to adjust various image capture settings, image processing settings, and/or display settings (e.g., contrast filter settings, brightness settings, global gamma correction settings, adaptive histogram equalization filter settings, etc.). Any or all of the operations of the programmable circuit 150 described herein could be based, at least in part, on the interactions with the GUI. The programmable circuit 150 could also include one or more hardware data interfaces, which may provide a communicative link between the programmable circuit 150 and other elements of image processing device 100. In some embodiments, the GUI could also display notifications or other types of information to the user. For example, a display of the GUI could display adjusted images and/or other information.

The memory 154 may include a non-transitory computer-readable medium, such as, but not limited to, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc. Memory 154 could include information that may be used to configure and/or reconfigure the programmable circuit 150.

The at least one processor 152 of programmable circuit 150 may be configured to execute instructions stored in the memory 154 so as to carry out various operations and method steps/blocks described herein. The instructions may be stored in a permanent or transitory manner in the memory 154.

Figure 5A:
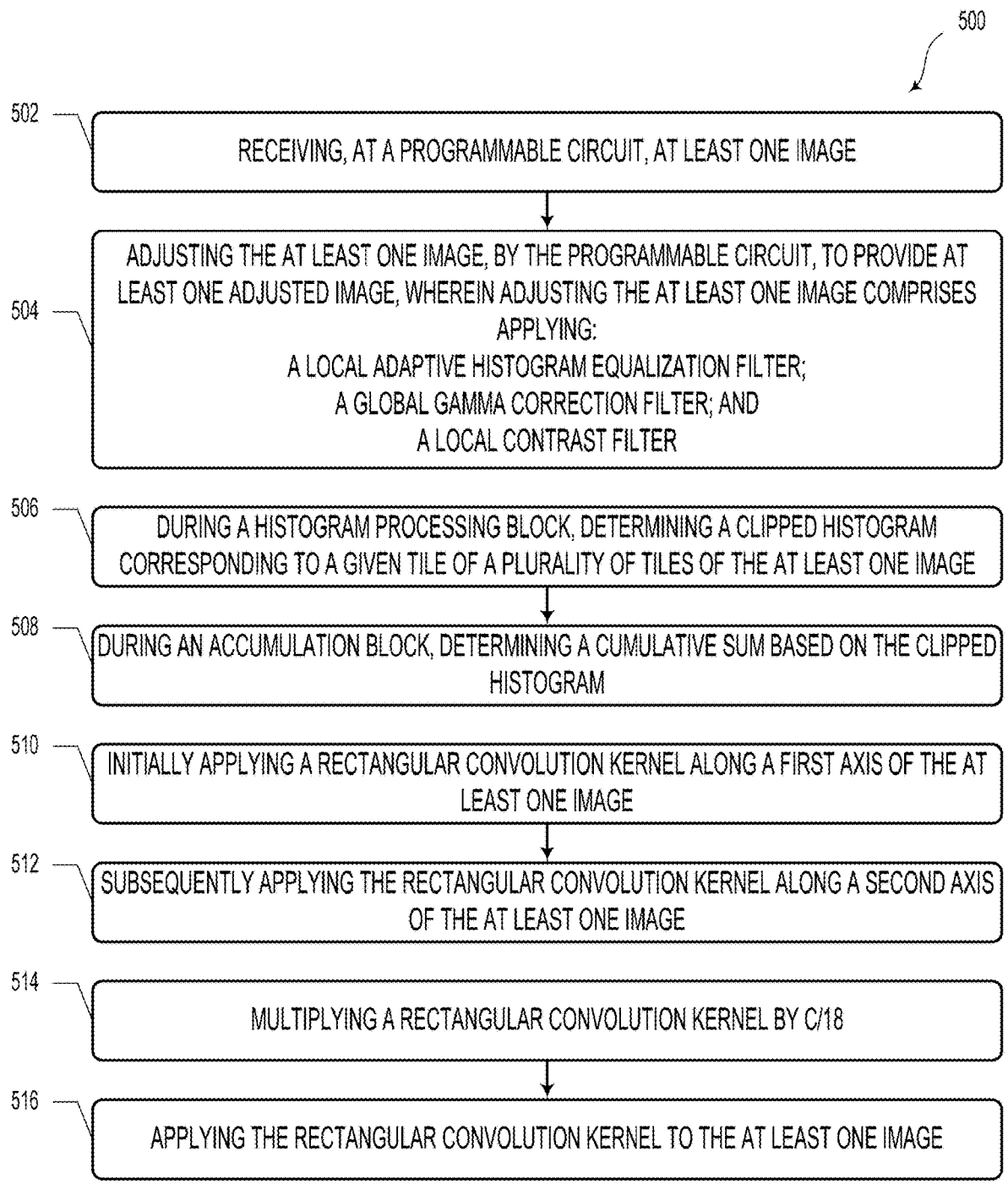
FIG. 5A illustrates a method, according to an example implementation.
Figure 5B:
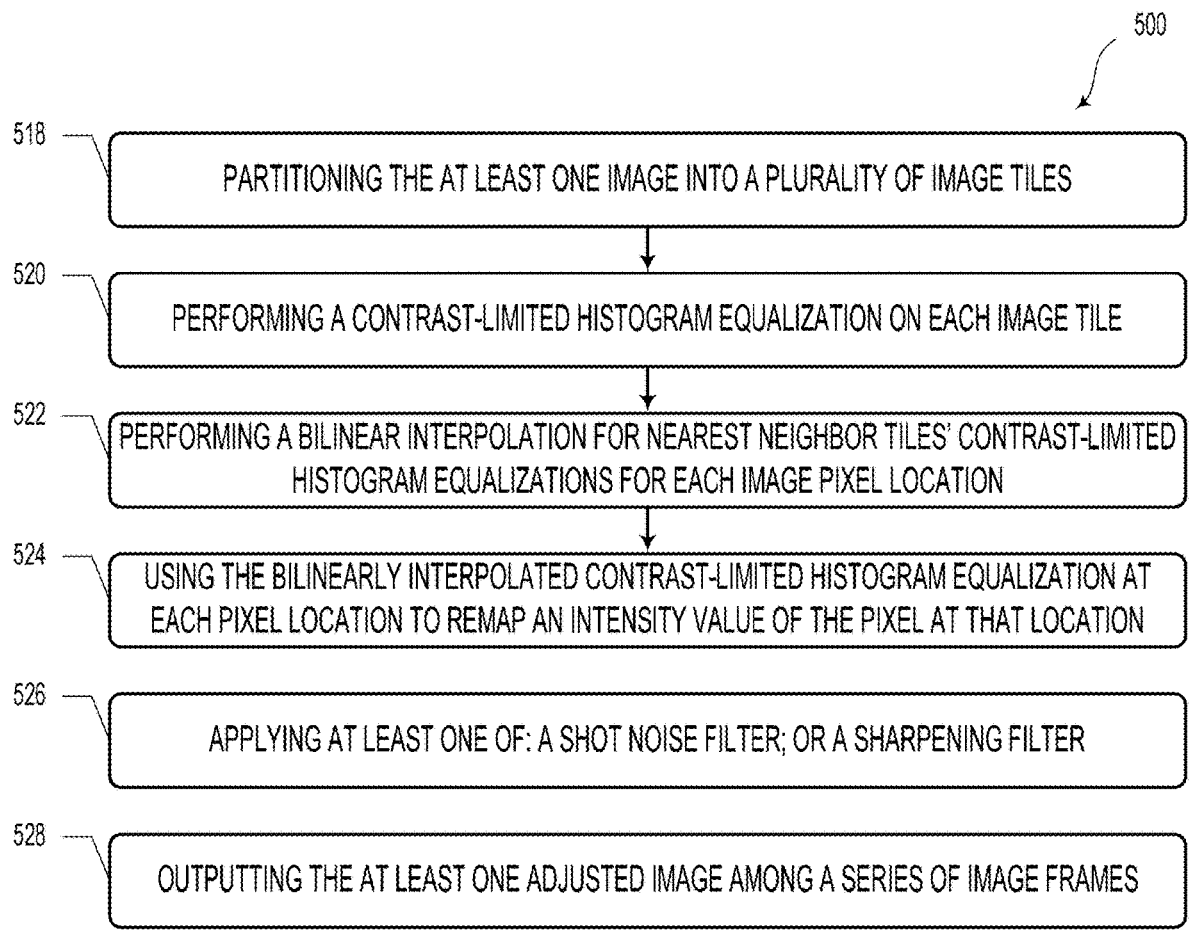
FIG. 5B illustrates a method, according to an example implementation.

As an example, the programmable circuit 150 could be configured to carry out various operations such as those of method 500 as illustrated and described in relation to FIGS. 5A and 5B.

Example embodiments could include performing image processing operations, such as receiving the at least one image 116. In example embodiments, the at least one image 116 could be received from the at least one camera 110. In some embodiments, the image(s) 116 could include a greyscale image or a color image of a scene. In example embodiments the at least one image 116 could received over a low latency data channel, such as a high-bandwidth network link and/or an optical fiber data link. Other types of low-latency data channels are possible and contemplated.

The image processing operations could include adjusting the at least one image 116 to provide at least one adjusted image 118. In such scenarios, adjusting the at least one image 116 could include applying a plurality of image adjustments. In such scenarios, adjusting the at least one image 116 could include applying: a local adaptive histogram equalization filter 160, a global gamma correction filter 162, and a local contrast filter 164.

The various image adjustments could be in the form of a set of instructions executable by the processor(s) 152. Additionally or alternatively, the image adjustments could be performed by a hardware filter.

The local adaptive histogram equalization filter 160 could be an image processing method or technique to improve contrast in the image 116. The local adaptive histogram equalization filter 160 may compute several histograms, each corresponding to a respective block, or local region, of the image 116. The several histograms could be utilized to redistribute the lightness values in the adjusted image 118. Furthermore, the local adaptive histogram equalization filter 160 may provide enhancements in edge definition in the adjusted image 118.

In some embodiments, the local adaptive histogram equalization filter 160 could include a Contrast Limited Adaptive Histogram Equalization (CLAHE) process or method. For example, the local adaptive histogram equalization filter 160 could have at least three parameters: block size, histogram bins, and maximum slope. The block size could define the size of the local region around a pixel for which a corresponding histogram is equalized. The block size can be selected to be similar or larger than the size of features to be preserved. The histogram bins include the number of bins utilized in the histogram equalization. The number of histogram bins can be selected to be similar or smaller than the number of pixels in a single block. The maximum slope limits the contrast "stretch" in an intensity transfer function. Large values of maximum slope will maximize local contrast while smaller values will introduce lower changes in local contrast. A maximum slope value of 1 will provide the original image.

Put another way, the CLAHE process may split or segment an image into tiles and may perform contrast limited histogram equalization on each tile. In such a scenario, the output value for any given pixel is determined by a bilinear interpolation of the contrast limited histograms of the four nearest tiles (e.g., the two nearest tiles at the image edges and just the nearest tile at the image corners). Performing contrast limited histogram equalization on relatively small tiles may provide contrast enhancement to suit local scene statistics. Using a bilinear interpolation of the neighboring image histograms has the effect of blending the tiles together seamlessly.

To accommodate the computational limitations of the processor(s) 152 (e.g., the FPGA), the processor(s) 152 may be configured to execute various method steps of the CLAHE process in a serial fashion to provide a pipelined process. For example, the CLAHE process may include partitioning the image 116 into a plurality of tile images. In some embodiments, partitioning the image 116 into the plurality of tile images includes partitioning the image 116 in a horizontal direction across a width of the image 116 and in a vertical direction across a length of the image 116 into the plurality of tile images.

In some embodiments, the processor(s) 152 may store a subset of the plurality of raw pixels of the image 116 in parallel with partitioning the at least one image 116. The subset of raw pixels correlate to the tile images undergoing serially processing by the processor(s) 152. In some embodiments, the raw pixels may be stored, for example, in a first in, first out (FIFO) queue to be retrieved later for downstream processing.

Next, the processor(s) 152 may compute a histogram for each tile image. In some embodiments, the histogram bins correlate to a pixel intensity value within each tile image. Further, the processor(s) 152 may redistribute histogram values exceeding a predetermined histogram value threshold to establish an equalized histogram for each tile image. The processor(s) 152 may then calculate a cumulative distribution function (CDF) for the equalized histograms for each tile image. In some embodiments, to accommodate for the computational capabilities of the processor(s) 152, the histogram computation, redistribution, and CDF calculation is done serially (i.e., one tile image at a time).

In example embodiments, the processor(s) 152 may perform a bilinear interpolation for nearest neighbor tiles of each tile image of the contrast limited histograms of the four nearest tiles (e.g., the two nearest tiles at the image edges and just the nearest tile at the image corners). In some embodiments, the bilinear interpretation involves determining a transformation function for each tile image. The transformation function is proportional to the CDF. More specifically, a maximum slope of the CDF limits the contrast adjustment of the transformation function.

The processor(s) 152 may then retrieve the stored raw pixels serially from the FIFO to calculate an adjusted pixel intensity value for each stored pixel based on a weighted average of transformation functions corresponding to the nearest neighbor tiles to establish an adjusted pixel. The weighted average is calculated based on the neighbor tile location with respect to the pixel location. For example, if a pixel is located near the left edge of a tile image, the left tile image transformation function is weighted greater than the right tile image transformation function when calculating the adjusted pixel intensity value.

To further accommodate the limited computational capacity and memory of the processor(s) 152, after calculating the adjusted pixel intensity value, each raw pixel of the stored subset of pixels is serially deleted once the pixel adjustment is completed. The processor(s) 152 may then align or stich the adjusted pixels to form the adjusted image 118.

In some embodiments, the global gamma correction filter 162 could be utilized to adjust intensity or luminance values in the adjusted image 118 as compared to the original image 116. For a given set of pixel intensity levels, the global gamma correction filter 162 could remap the intensity levels so as to conform to a power-law relationship or another type of relationship so as to provide the best viewing conditions for an ARO. In such a scenario, the intensity values of the original image 116 could be adjusted so as to substantively fit the nonlinear power law equation. For example, the luminance or intensity values could be remapped according to a linearly-increasing encoding signal in adjusted image 118. Such encoding could enhance the perception of different intensity levels within grayscale images.

In some embodiments, applying the local contrast filter 164 could include applying a rectangular convolution kernel to a plurality of 3×9 and 9×3 pixel regions of the at least one image 116. For example, the local contrast filter 164 could include initially applying the rectangular convolution kernel along a first axis of the at least one image 116 and subsequently applying the rectangular convolution kernel along a second axis of the at least one image 116. As an example, the first axis and the second axis could be, but need not be, perpendicular.

As an example, the rectangular convolution kernel could be:

| −1.0 | −1.0 | −1.0 | 2 + 2/C | 2 + 2/C | 2 + 2/C | −1.0 | −1.0 | −1.0 |
|------|------|------|---------|---------|---------|------|------|------|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | where C is a number between 1 to 2. In such scenarios, the rectangular convolution kernel could be multiplied by a normalization factor prior to applying the local contrast filter. Various normalization factors are contemplated, but one example could be where the normalization factor is a value equal to C/18. In example embodiments, the normalization factor of C/18 may be applied to maintain an overall image brightness the same before and after the application of the local contrast filter. In some embodiments, normalization factors other than C/18 may provide additional uniform brightening or dimming of the image.

In an example embodiment, applying the rectangular convolution kernel could include multiplying each pixel of the 3×9 pixel regions by the corresponding entry of the rectangular convolution kernel and taking the sum of the result of each multiplied entry. The sum could be adjusted (e.g., by multiplying the sum by the normalization factor C/18) and subsequently entered as the new intensity value of the central pixel of the 3×9 pixel region. Alternatively, the kernel itself could be multiplied by the normalization factor C/18 before application to the pixel regions.

Additionally, as described above, a 9×3 rectangular convolution kernel could be applied to a partially overlapping 9×3 pixel region of the image, which could share the same central pixel. Similarly, each pixel of the 9×3 pixel region may be multiplied by the corresponding entry of the rectangular convolution kernel. The overall sum of the multiplied entries may be adjusted (e.g., normalized) by the normalization factor and the adjusted sum may be utilized as an updated intensity value of the central pixel of the 9×3 pixel region.

In this manner, the rectangular convolution kernel(s) can be applied to each pixel of the image to provide, at least in part, the adjusted image, which may have superior image contrast properties as compared to the as-captured image.

In some embodiments, the operations may optionally include applying at least one of: a shot noise filter 166 or a sharpening filter 168.

The shot noise filter 166 could include a de-noising software or hardware filter. In some examples, the shot noise filter 166 could include a linear filter (e.g., an averaging or Gaussian filter) or non-linear de-noising filter (e.g., a median filter). Other types of shot noise or speckle noise filters are possible, including adaptive filters, such as a Wiener filter.

In some embodiments, the sharpening filter 168 could emphasize details such as edges of objects in an image. The sharpening filter 168 could include a Gaussian high pass filter and/or a Gaussian low pass filter. Unsharp filtering is also contemplated and possible within the scope of the present disclosure. In such scenarios, an unsharp mask may be subtracted away from the original image 116 to detect the presence of edges. Subsequently, contrast could be selectively increased along the detected edges, which may provide an image sharpening effect.

In an example embodiment, the sharpening filter 168 could include a 3×3 kernel. For example, the sharpening filter 168 kernel could be:

| −0.5 | −0.5 | −0.5 |
|------|------|------|
| −0.5 | 5    | −0.5 |
| −0.5 | −0.5 | −0.5 |

Alternatively, the sharpening filter 168 kernel could be:

| −9/8 | −9/8 | −9/8 |
|------|------|------|
| −9/8 | 10   | −9/8 |
| −9/8 | −9/8 | −9/8 |

It will be understood that other kernels are possible and contemplated for the sharpening filter 168.

While various operations are described herein as proceeding in a particular order, it will be understood that operations could be carried out in an alternative order. In some embodiments, the programmable circuit 150 could be configured to carry out the image adjustments in the following order: shot noise filter 166, sharpening filter 168, global gamma correction filter 162, local adaptive histogram equalization filter 160, and the local contrast filter 164. However, other orders are possible and contemplated.

In some embodiments, the programmable circuit 150 is configured to execute a parallel pipelined process 170. In such scenarios, adjusting the at least one image 116 includes applying at least one of the local adaptive histogram equalization filter 160, the global gamma correction filter 162, or the local contrast filter 164 by the parallel pipelined process 170.

In some embodiments, the parallel pipelined process 170 could include, during a histogram processing block 172, determining a clipped histogram corresponding to a given tile of a plurality of tiles of the at least one image 116. The parallel pipelined process 170 could additionally include, during an accumulation block 174, determining a cumulative sum based on the clipped histogram.

The imaging processing device 100 could include at least one camera 110. The at least one camera 110 could include a first camera 112 and a second camera 114, which could be configured to provide stereoscopic imagery. Furthermore the at least one camera 110 could be configured to provide infrared and/or visible light images. Other wavelength ranges are possible and contemplated.

The imaging processing device 100 could additionally include a display 130. The display 130 could include a video monitor or another type of display configured to provide viewable images and/or a graphical user interface.

The operations also include outputting the at least one adjusted image 118 to the display 130.

Figure 2A:
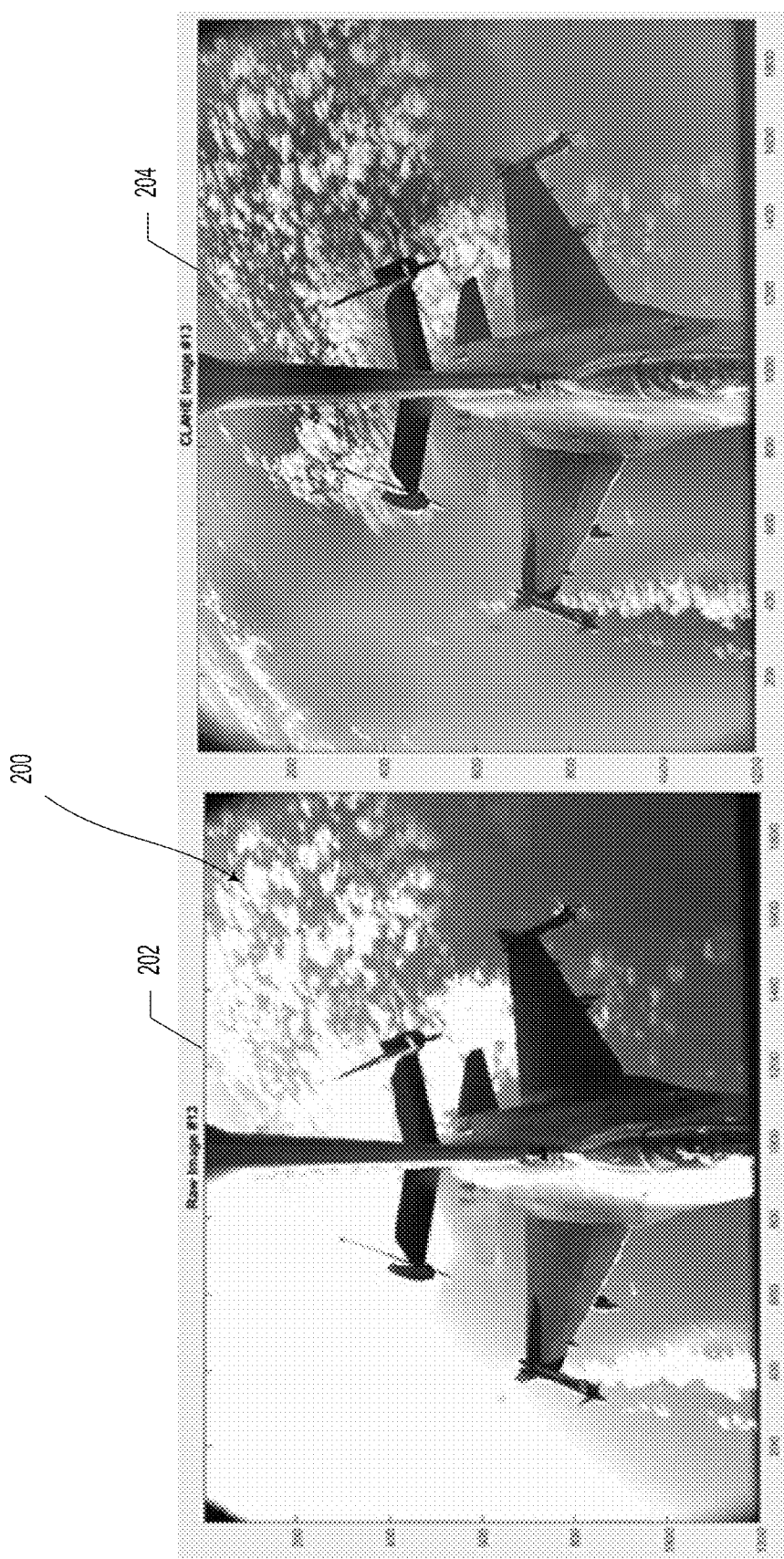
FIG. 2A illustrates an image and an adjusted image of a scene, according to an example implementation.

FIG. 2A illustrates an image 202 and an adjusted image 204 of a scene 200, according to an example implementation. The adjusted image 204 was provided based on the operations and methods described herein. As an example, the adjusted image 204 shows less glare, less noise, fewer blown highlights, and better exposure and contrast control, as compared to image 202.

Figure 2B:
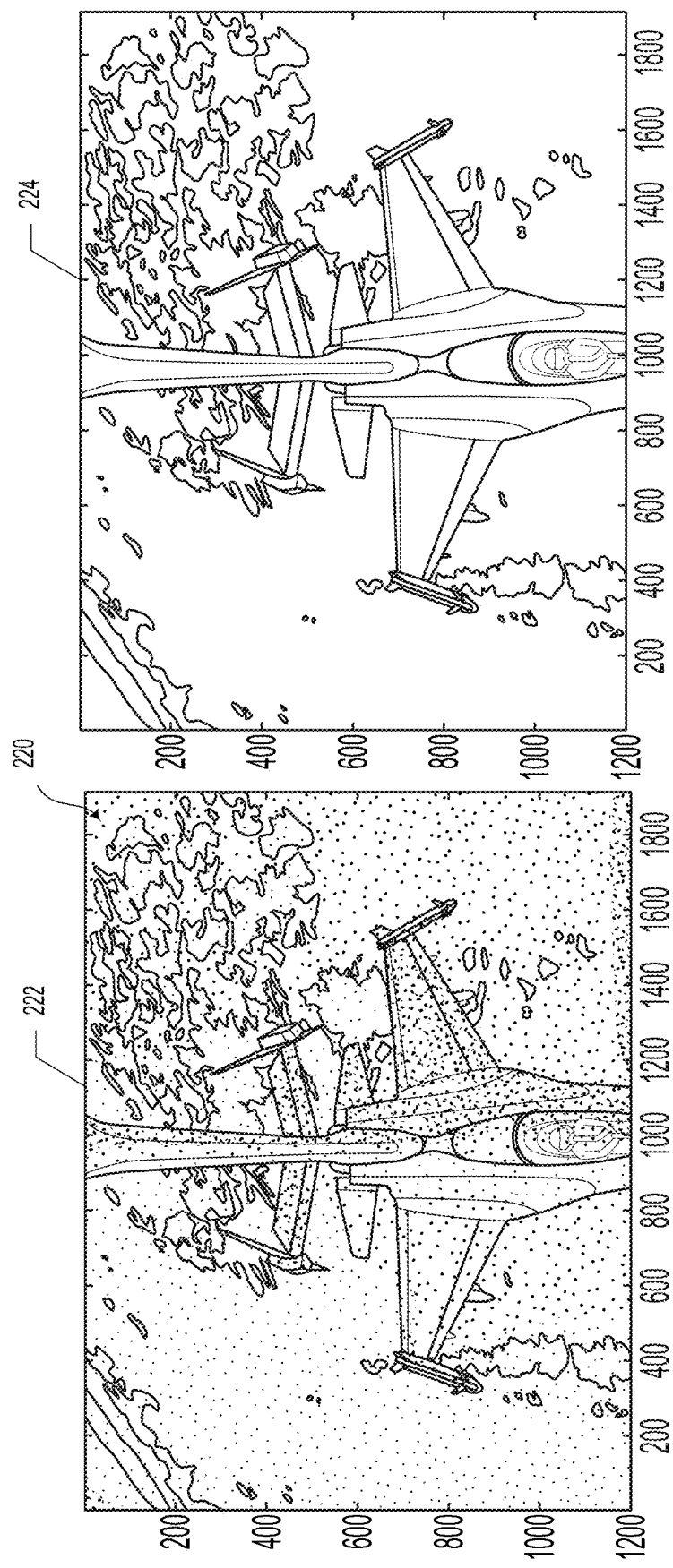
FIG. 2B illustrates an image and an adjusted image of a scene, according to an example implementation.

FIG. 2B illustrates line drawings of an image 222 and an adjusted image 224 of a scene 220, according to an example implementation. The adjusted image 224 could be provided based on carrying out the operations and/or methods described herein. As an example, the adjusted image 224 shows less noise and better object clarity, as compared to image 222.

Figure 2C:
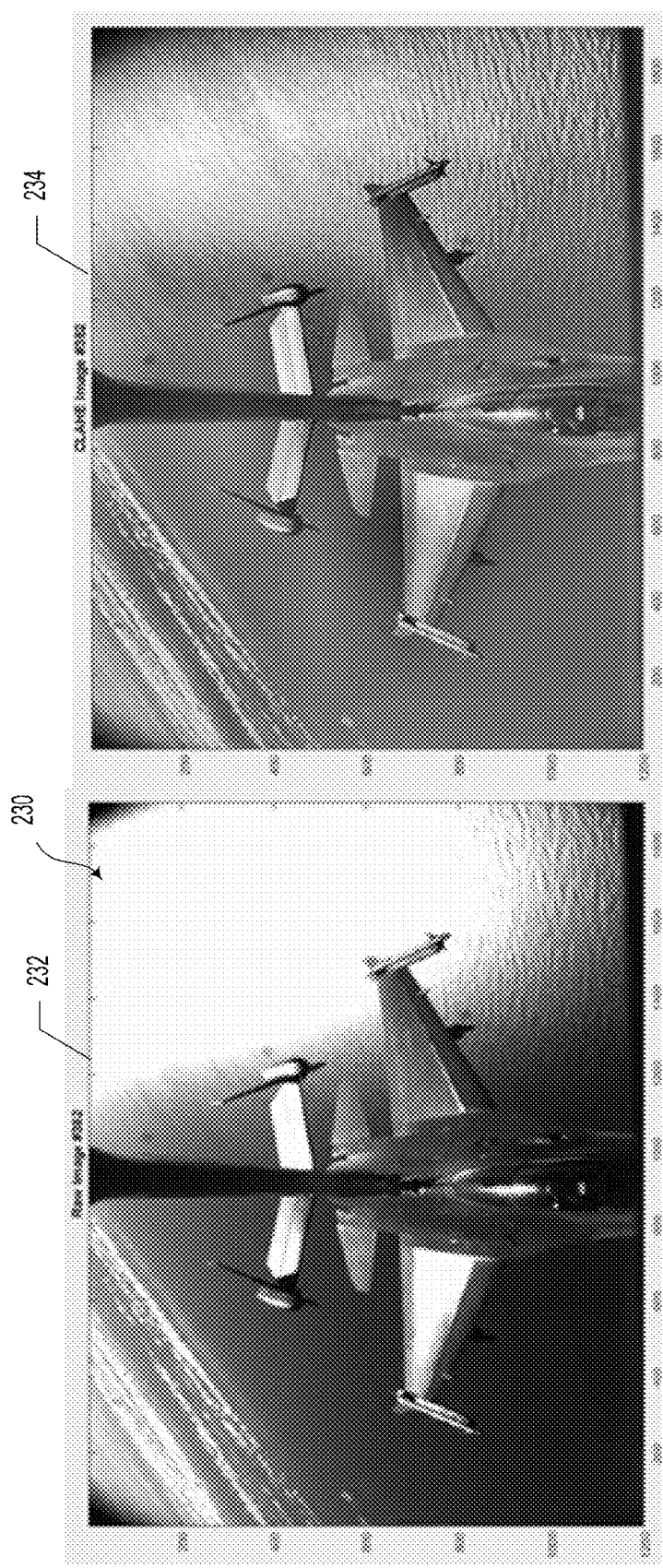
FIG. 2C illustrates an image and an adjusted image of a scene, according to an example implementation.

FIG. 2C illustrates an image 232 and an adjusted image 234 of a scene 230, according to an example implementation. The adjusted image 234 could be provided based on carrying out the operations and/or methods described herein. As an example, the adjusted image 234 shows less glare, less noise, fewer blown highlights, and better exposure and contrast control, as compared to image 232. As illustrated in FIG. 2C, the adjusted image 234 provides much better control of sunlight glare off of the wing surface of the second aircraft as well as off of the surface of the water in scene 230.

Figure 2D:
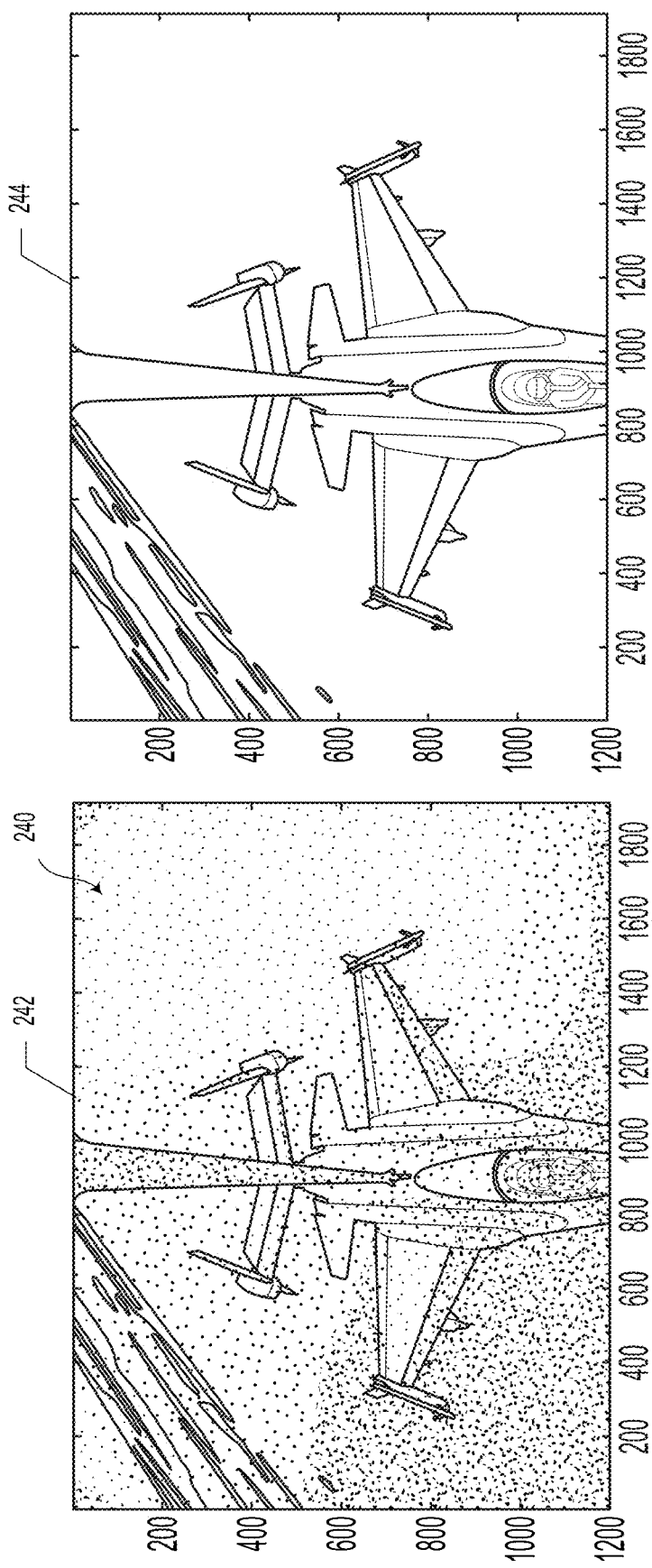
FIG. 2D illustrates an image and an adjusted image of a scene, according to an example implementation.

FIG. 2D illustrates line drawings of an image 242 and an adjusted image 244 of a scene 240, according to an example implementation. The adjusted image 244 could be provided based on carrying out the operations and/or methods described herein. As an example, the adjusted image 244 shows less noise and better object clarity, as compared to image 242.

Figure 2E:
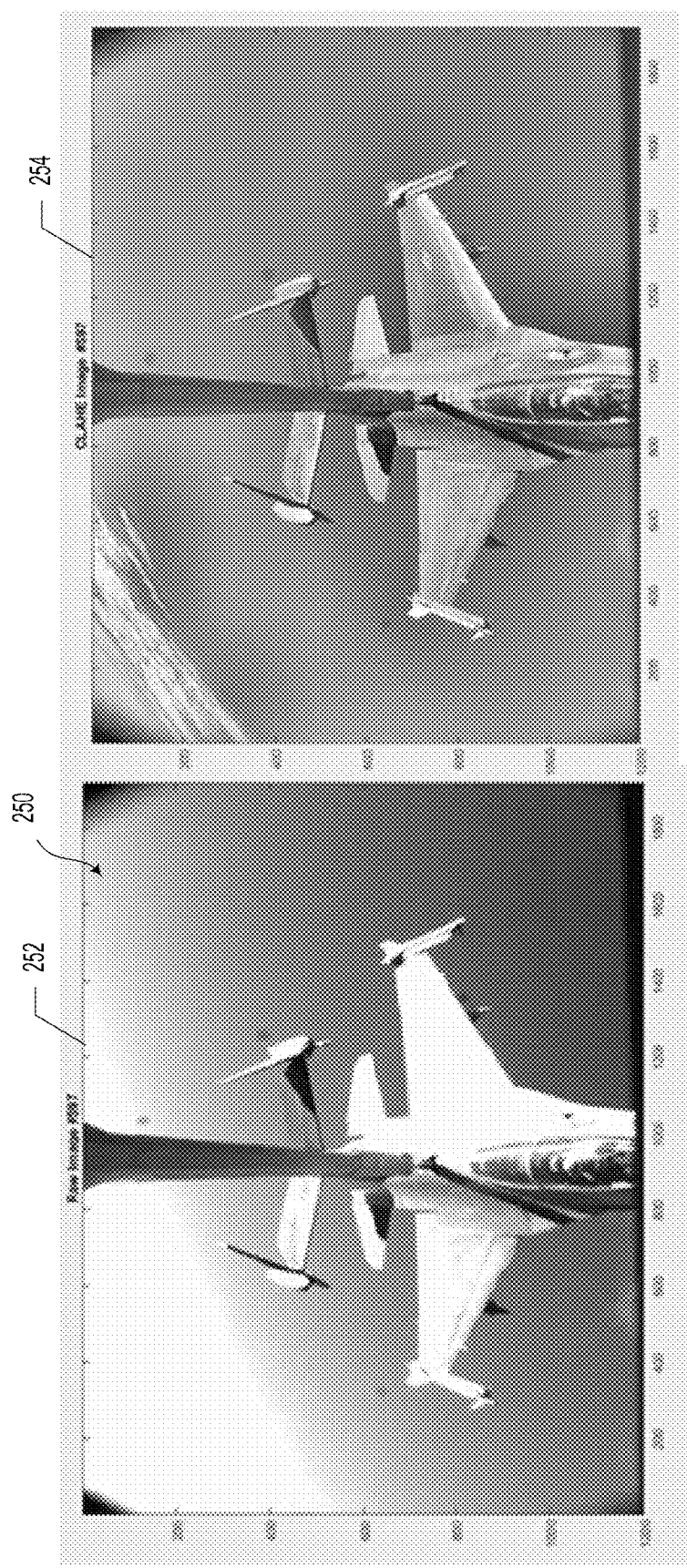
FIG. 2E illustrates an image and an adjusted image of a scene, according to an example implementation.

FIG. 2E illustrates an image 252 and an adjusted image 254 of a scene 250, according to an example implementation. The adjusted image 254 could be provided based on carrying out the operations and/or methods described herein. As an example, the adjusted image 254 shows less glare, less noise, fewer blown highlights, and better overall exposure and contrast control, as compared to image 252. As illustrated in FIG. 2E, the adjusted image 254 provides much better control of sunlight glare off of the wing surfaces of the second aircraft and enhances the characteristic features of the second aircraft.

Figure 2F:
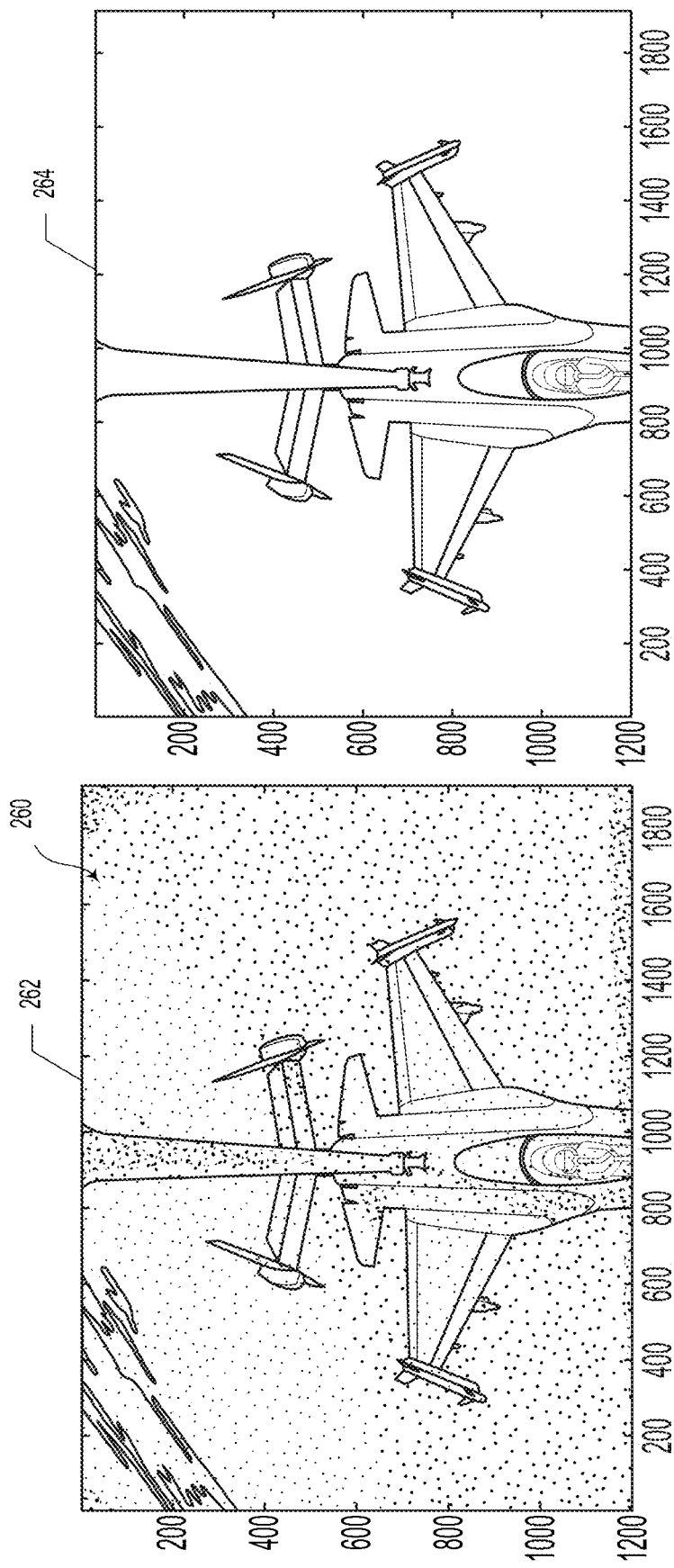
FIG. 2F illustrates an image and an adjusted image of a scene, according to an example implementation.

FIG. 2F illustrates line drawings of an image 262 and an adjusted image 264 of a scene 260, according to an example implementation. The adjusted image 264 could be provided based on carrying out the operations and/or methods described herein. As an example, the adjusted image 264 shows less noise and better object clarity, as compared to image 262.

III. Example Aerial Refueling Aircraft

Figure 3:
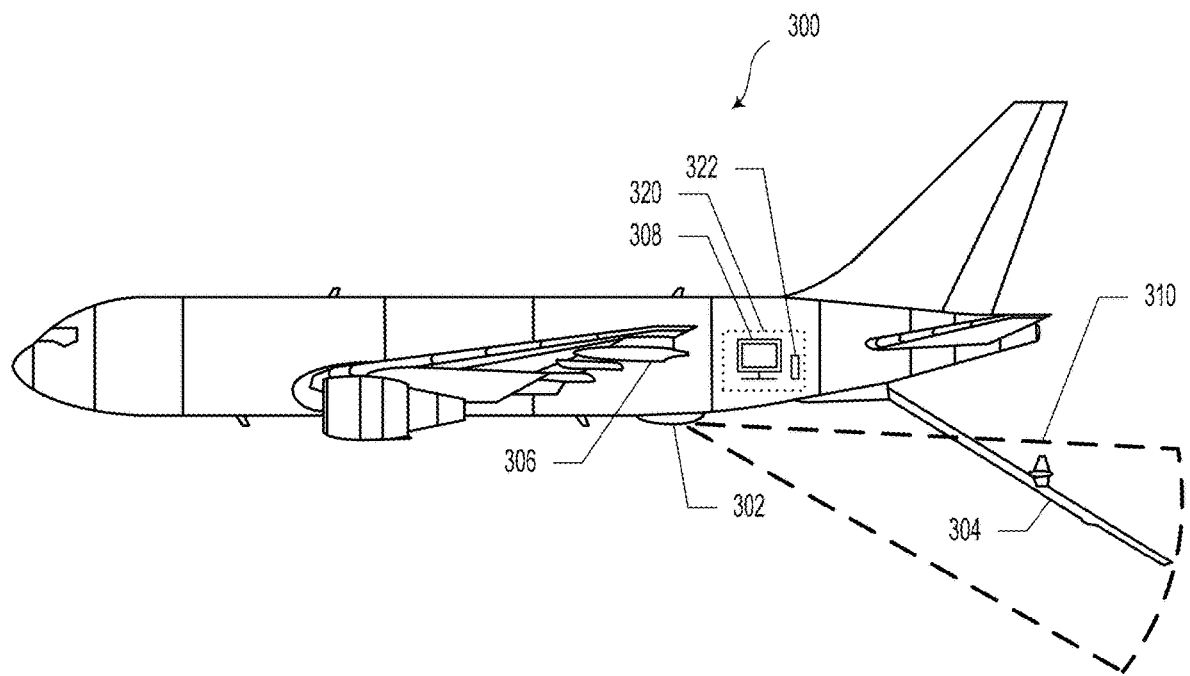
FIG. 3 illustrates aerial refueling aircraft, according to an example implementation.

FIG. 3 illustrates aerial refueling aircraft 300, according to an example implementation. The aerial refueling aircraft 300 could include jet aircraft such as a tanker aircraft or another type of commercial aircraft. In other embodiments, the aerial refueling aircraft 300 could include a drone tanker aircraft or another type of aerial vehicle.

Aerial refueling aircraft 300 could include elements that are similar or identical to image processing device 100. For example, aerial refueling aircraft 300 could include one or more cameras 302. Furthermore, aerial refueling aircraft 300 could include a centerline refueling boom 304 and/or one or more wingtip drogue refueling systems 306. The one or more cameras 302 may include a field of view 310 that could include a region around the centerline refueling boom 304 and/or the wingtip drogue refueling systems 306. In such scenarios, the at least one camera 302 could be configured to provide the at least one image of the at least one centerline refueling boom 304 (and/or wingtip drogue refueling system 306) and a second aircraft (e.g., second aircraft 402, as described with reference to FIGS. 4A and 4B). The images could assist an ARO to controllably adjust a position of the centerline refueling boom 304, the wingtip drogue refueling systems 306, and/or the aerial refueling aircraft 300 with respect to the other aircraft.

The aerial refueling aircraft 300 also includes a display 308. The display 308 could be a part of an operator control interface 320, which may be located inside the fuselage of the aerial refueling aircraft 300. The at least one image could be provided to an ARO by way of the display 308 of the operator control interface 320. The operator control interface 320 could be configured to cause at least one movement of the at least one centerline refueling boom 304 or wingtip drogue refueling system 306 with respect to a fuel receptacle of the second aircraft. For example, an ARO may interact with the operator control interface 320 so as to adjust in-air refueling operations of the aerial refueling aircraft 300 in response to the displayed images.

The aerial refueling aircraft 300 additionally includes a programmable circuit 322. The programmable circuit 322 is configured to provide image data to the display 308. The programmable circuit 322 is configured to carry out operations. The operations could include receiving, by the programmable circuit 322, at least one image (e.g., image 116).

The operations also include adjusting the at least one image, by the programmable circuit 322, to provide at least one adjusted image (e.g., adjusted image 118). In such scenarios, adjusting the at least one image could include applying a local adaptive histogram equalization filter (e.g., local adaptive histogram equalization filter 160). Adjusting the at least one image could also include a global gamma correction filter (e.g., global gamma correction filter 162).

In some embodiments, adjusting the at least one image could include applying a local contrast filter (e.g., local contrast filter 164). For example, applying the local contrast filter could include applying a rectangular convolution kernel to a plurality of 3×9 and 9×3 pixel regions of the at least one image. In such scenarios, applying the local contrast filter could include initially applying a rectangular convolution kernel along a first axis of the at least one image and subsequently applying the rectangular convolution kernel along a second axis of the at least one image. The first axis and the second axis could be perpendicular. However, in other embodiments, the first axis and the second axis need not be perpendicular.

As described elsewhere herein, applying the local contrast filter could include applying a rectangular convolution kernel to the at least one image. In such scenarios, the rectangular convolution kernel could be:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 | where C is a number between 1 to 2. Furthermore, the rectangular convolution kernel could be multiplied by a normalization factor prior to applying the local contrast filter. In some embodiments, the normalization factor could be C/18. However, other normalization factors are possible and contemplated. As described herein, normalization factors other than C/18 could be used to introduce additional uniform brightening or dimming of the image.

In some embodiments, the programmable circuit 322 could be configured to execute a plurality of program instructions in a parallel pipelined process (e.g., parallel pipelined process 170). In such scenarios, adjusting the at least one image could include applying at least one of the local adaptive histogram equalization filter, the global gamma correction filter, or the local contrast filter by the parallel pipelined process.

In some embodiments, the parallel pipelined process could include, during a histogram processing block (histogram processing block 172), determining a clipped histogram corresponding to a given tile of a plurality of tiles of the at least one image.

The parallel pipelined process may additionally include, during an accumulation block (e.g., accumulation block 174), determining a cumulative sum based on the clipped histogram.

The operations additionally include outputting the at least one adjusted image to the display 308. In some embodiments, the operations could include outputting the at least one adjusted image among a series of image frames. In such a scenario, the image frames could be output at a frame rate of at least 59.94 frames per second or a frame rate suitable for high-definition video.

Figure 4A:
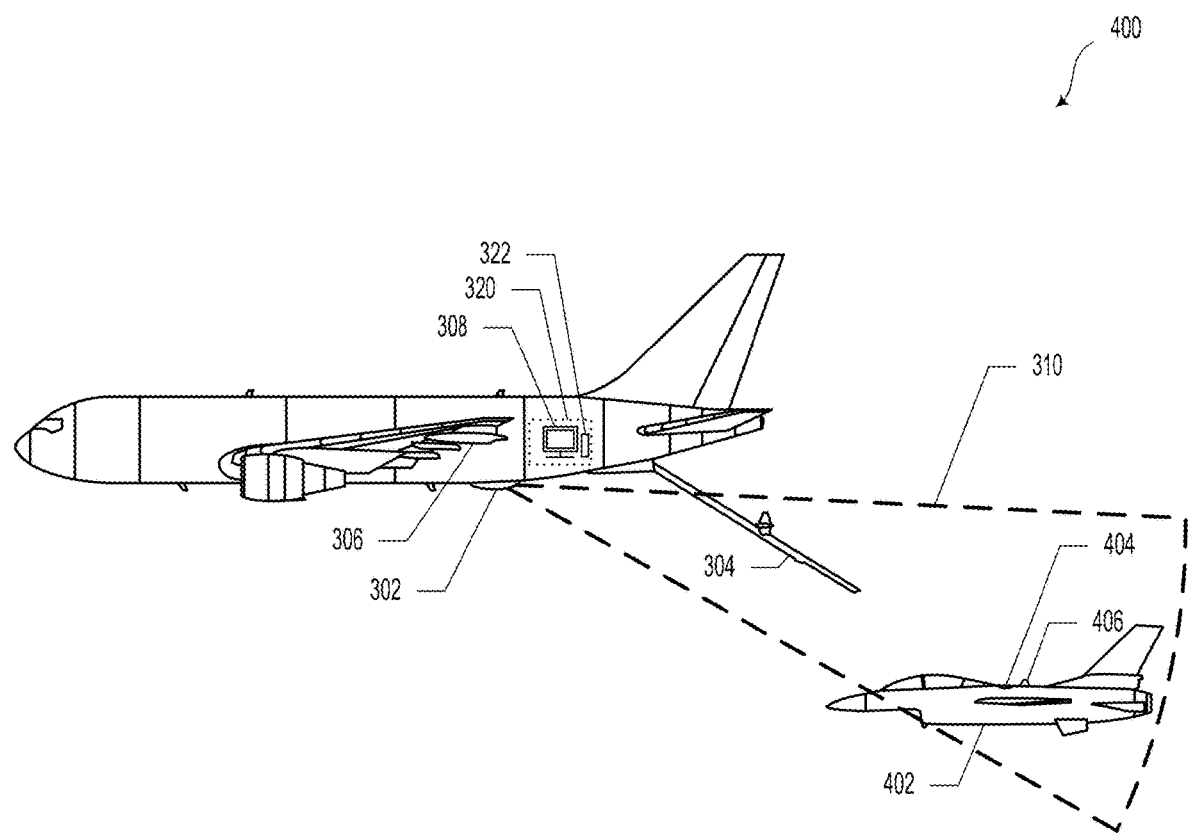
FIG. 4A illustrates an operating scenario involving the aerial refueling aircraft of FIG. 3, according to an example implementation.

FIG. 4A illustrates an operating scenario 400 involving the aerial refueling aircraft 300 of FIG. 3, according to an example implementation. Operating scenario 400 may include the aerial refueling aircraft 300 being in proximity to a second aircraft 402. In an embodiment, the second aircraft 402 could be approaching the aerial refueling aircraft 300 (e.g., so as to receive fuel). Alternatively, the second aircraft 402 could be moving away from the aerial refueling aircraft 300 (e.g., after receiving fuel). While the second aircraft 402 is illustrated in FIG. 4A as being an F-16, the second aircraft 402 could include any aerial vehicle configured to receive fuel while in flight. In such scenarios, the second aircraft 402 includes a fuel receptacle 404. Optionally, the second aircraft 402 could include characteristic features 406, such as antennas, registration markings, contours, edges, etc. that may be captured by the image 116, and which may be enhanced in the adjusted image 118. Such characteristic features 406 may aid AROs to more safely and/or more efficiently conduct in-air refueling operations.

Figure 4B:
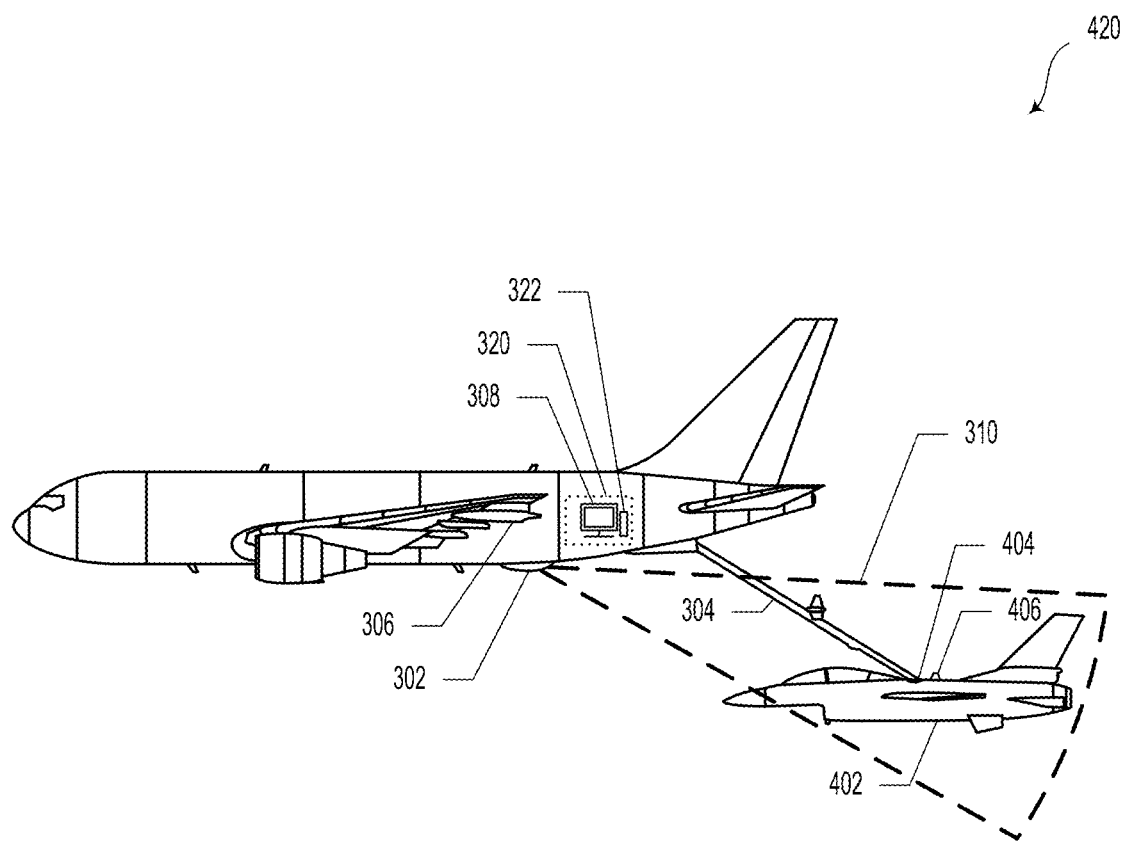
FIG. 4B illustrates an operating scenario involving the aerial refueling aircraft of FIG. 3, according to an example implementation.

FIG. 4B illustrates an operating scenario 420 involving the aerial refueling aircraft 300 of FIG. 3, according to an example implementation. As illustrated in FIG. 4B, the second aircraft 402 may be physically coupled to the centerline refueling boom 304 so as to receive fuel from the aerial refueling aircraft 300 via the fuel receptacle 404. While being physically coupled to the centerline refueling boom 304, the ARO may observe the second aircraft 402 and its characteristic features 406 on the display 308 so as to maintain proper relative spacing and/or relative position between the aerial refueling aircraft 300, the centerline refueling boom 304, and the second aircraft 402.

IV. Example Methods

FIGS. 5A and 5B illustrate a method 500, according to an example implementation. Method 500 may involve elements of imaging processing device 100 and/or aerial refueling aircraft 300 as illustrated and described in reference to FIG. 1 and FIG. 3, respectively. Additionally or alternatively, some or all elements of method 500 may relate to operating scenarios 400 and 420 as illustrated in FIGS. 4A and 4B. While FIGS. 5A and 5B illustrate certain blocks or steps of method 500 as following a specific order, it will be understood that some blocks or steps of method 500 could be omitted and/or other blocks or steps could be included. Furthermore, the blocks or steps of method 500 could be carried out in a different order, in parallel (e.g., concurrently), and/or repeated. In some embodiments, at least some blocks of method 500 could be carried out, at least in part, by programmable circuit 150, as illustrated and described in reference to FIG. 1.

Method 500 could provide a method to process video and/or still images. Block 502 includes receiving, at a programmable circuit (e.g., an FPGA), at least one image (e.g., image 116). In some embodiments, the at least one image could include a plurality of images from one or more cameras.

In some embodiments, the at least one image comprises an image pair. In such scenarios, the image pair includes a first image captured by a first camera and a second image captured by a second camera. In such scenarios, the first camera and the second camera could be configured to provide stereoscopic imagery. In some embodiments, such stereoscopic imagery may provide an apparent three-dimensional view of the scene.

Block 504 includes adjusting the at least one image, by the programmable circuit, to provide (at a data output or at a display) at least one adjusted image (e.g., adjusted image 118). Adjusting the at least one image includes applying: a local adaptive histogram equalization filter (e.g., CLAHE or local adaptive histogram equalization filter 160), a global gamma correction filter (e.g., global gamma correction filter 162), and a local contrast filter (e.g., local contrast filter 164).

In some embodiments, the programmable circuit could be configured to execute a plurality of program instructions in a parallel pipelined process. In such a scenario, adjusting the at least one image could include applying at least one of the local adaptive histogram equalization filter (e.g., CLAHE), the global gamma correction filter, or the local contrast filter by the parallel pipelined process.

In such scenarios, the parallel pipelined process to carry out the CLAHE process could include, during a histogram processing block, determining 506 a clipped histogram corresponding to a given tile of a plurality of tiles of the at least one image.

As an example, the method may include partitioning the image into a plurality of tile images. In some embodiments, partitioning the image into the plurality of tile images includes partitioning the image in a horizontal direction across a width of the image and in a vertical direction across a length of the image into the plurality of tile images.

In some embodiments, a subset of the plurality of raw pixels of the image may be stored in parallel with partitioning the at least one image. In such scenarios, the subset of raw pixels may correlate to the tile images undergoing serially processing. In some embodiments, the raw pixels may be stored, for example, in a first in, first out (FIFO) queue to be retrieved later for downstream processing.

Determining the clipped histogram could additionally or alternatively include computing a histogram for each tile image. In some embodiments, the histogram bins correlate to a pixel intensity value within each tile image. Further, histogram values exceeding a predetermined histogram value threshold could be redistributed to establish an equalized histogram for each tile image.

The parallel pipelined process could additionally include, during an accumulation block, determining 508 a cumulative distribution function (e.g., a CDF or another type of cumulative sum) based on the clipped histogram. For example, a CDF could be calculated for the equalized histograms for each tile image. In some embodiments, to accommodate for the computational capabilities of the programmable circuit, the histogram computation, redistribution, and CDF calculation could be performed serially (i.e., one tile image at a time).

In some embodiments, the CLAHE process could include calculating a bilinear interpolation for nearest neighbor tiles of each tile image of the contrast limited histograms of the four nearest tiles (e.g., the two nearest tiles at the image edges and just the nearest tile at the image corners). In some embodiments, the bilinear interpretation involves determining a transformation function for each tile image. The transformation function is proportional to the CDF. More specifically, a maximum slope of the CDF limits the contrast adjustment of the transformation function.

The method could include retrieving the stored raw pixels serially from the FIFO to calculate an adjusted pixel intensity value for each stored pixel based on a weighted average of transformation functions corresponding to the nearest neighbor tiles to establish an adjusted pixel. The weighted average could be calculated based on the neighbor tile location with respect to the pixel location. For example, if a pixel is located near the left edge of a tile image, the left tile image transformation function could be weighted more heavily than the right tile image transformation function when calculating the adjusted pixel intensity value.

To further accommodate the limited computational capacity and memory of the programmable circuit, after calculating the adjusted pixel intensity value, each raw pixel of the stored subset of pixels is serially deleted once the pixel adjustment is completed. The programmable circuit may then align or stich the adjusted pixels to form the adjusted image.

In some embodiments, applying the local contrast filter includes initially applying 510 a rectangular convolution kernel along a first axis of the at least one image and subsequently applying 512 the rectangular convolution kernel along a second axis of the at least one image. In some embodiments, the first axis and the second axis are perpendicular.

In some embodiments, applying the local contrast filter could include initially multiplying 514 a rectangular convolution kernel by a normalization factor of C/18. In some embodiments, the normalization factor is C/18. However, the normalization factor could be a different value. In such scenarios, multiplying the rectangular convolution kernel by a normalization factor other than C/18 may uniformly brighten or darken the at least one image.

Additionally or alternatively, applying the local contrast filter includes applying the rectangular convolution kernel to the at least one image. In some embodiments, applying the local contrast filter could include applying 516 a rectangular convolution kernel to a plurality of 3×9 and 9×3 pixel regions of the at least one image. For example, the rectangular convolution kernel could be:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 |

C could be a value between 1 to 2.

In some embodiments, applying the local adaptive histogram equalization filter could include partitioning 518 the at least one image into a plurality of image tiles. Applying the local adaptive histogram equalization filter also includes performing 520 a contrast-limited histogram equalization on each image tile and performing 522 a bilinear interpolation for nearest neighbor tiles' contrast-limited histogram equalizations for each image pixel location. Applying the local adaptive histogram equalization filter also includes using 524 the bilinearly interpolated contrast-limited histogram equalization at each pixel location to remap the intensity value of the pixel at that location.

To accommodate pipelined parallel processing architectures, the systems and methods described herein may be executed in a different manner compared to conventional techniques. In so doing, calculating the contrast limited (clipped) histograms for each tile can be performed with very low latency. For illustrative purposes only, an example implementation is described below.

In an example embodiment, h1(:,idx1,idx2) represents a histogram of the gamma-corrected, nBitsOut-converted input pixels for a given image tile (idx1,idx2). A clipped histogram, h3, is determined, where h3 has the same number of pixels as in the image tile (e.g., sum(h3)=nPixTile). However, max(h3)<=Hmax, where Hmax is an integer number representing a maximum number of counts. Heuristically, this calculation has the same effect as creating an intermediate histogram, hTemp=min(h1+(Hmax−Ho), Hmax), where Ho is the smallest non-negative integer such that sum(hTemp)<=sum(h1). h3 is created from hTemp by adding 1 to the first sum(h1)−sum(hTemp) bins of hTemp for which hTemp<Hmax. Accordingly, sum(h3)=sum(h1)=nPixTile. The CLAHE pixel transform for the given image tile is then calculated as Xform=floor(cumsum(h3)/nPixTile*($2^{nBitsOut-1}$)). Xform may represent a look up table that maps the pixel value stored in memory to an output value for the given image tile where outputValue=Xform(storedValue+1).

Although this is the exact effect of the programmable circuit code, it is executed differently on a parallel pipelined processor. For example, the programmable circuit code is configured to be executed in a pipelined fashion. Furthermore, the programmable circuit code is configured to execute the exact same operations the exact same number of times in the exact same order without regard to the input data. To provide this capability, another histogram, h2, is calculated along with h1. h2(:,idx1,idx2) is the h2 histogram for tile (idx1,idx2). The (idx1,idx2) indices will be ignored below in this description, as all calculations are for the same image tile. In such scenarios, h2(1) is the number of bins in h1 with values>=Hmax. For all k>=1, h2(k+1) is the number of bins in h1 with value Hmax-k. Some of the bins in h2 may be zero. h2(Hmax+1) is the number of bins in h1 with a zero value, and is the last bin in h2. Accordingly, sum(h2)=nHist, the number of histogram bins in h1. Furthermore, nHist=$2^{nBitsOut}$.

The first step of the parallel pipelined process is to scan through h2, visiting each h2 bin exactly once, and extracting information used to build the clipped histogram, h3. Effectively, h3 can be thought of as being created by taking all the pixels in h1 above the Hmax threshold and redistributing them below the Hmax threshold. All the h1 levels above Hmax get lowered to Hmax and all the h1 levels below Hmax get increased by some amount. h2(k+1) is used to determine dn(k+1), which represents the increase in each h1 bin with level Hmax-k. This definition requires dn(1)=0, since the h1 bins with level>=Hmax aren't increased, but decreased. Initially, it is assumed that each h1 bin with a particular level gets increased by the same amount. However, doing so will typically leave a few (<nHist) pixels left over that are unable to evenly populate any h1 level. To account for these extra pixels, the pixels moved below the Hmax threshold are counted as they are moved below the threshold. The number of pixels moved below the threshold thus far is stored in dNsum. Eventually, a level will likely be reached where there are not enough pixels to evenly distribute across the h1 bins at that level and below. When this happens, Ho is set to that level. However, subsequent values of dn(k+1) are still calculated as if the each of the corresponding h1 levels will all be increased by the same amount, though some will get increased by one more. In such scenarios, three calculations from this first step correspond to array do and the values dNsum and Ho. Each of these arrays or values is used in a second step, described below.

The second, and final, step of the parallel pipelined process is to build h3 beginning with the first bin and continuing on to the final bin, performing a cumulative sum of h3 along the way, and setting Xform, the definition of which is set forth above, for that bin equal to the cumulative sum of h3 up to that bin times a constant, truncated to an integer. The h3 value for h1 bins with levels>=Hmax are simply set to Hmax. The h3 value for all h1 bins at a particular level, Hmax-k, with Ho<Hmax-k<Hmax, are set to Hmax-k+dn(k+1). The h3 value for h1 bins at a particular level, Hmax-k, with Hmax-k<=Ho, are either set to Hmax-k+dn(k+1) or Hmax-k+dn(k+1)+1. The number of pixels in h1 that are over the Hmax threshold is designated by nOver. Whenever an h1 bin with level Hmax-k<=Ho is encountered, and dNsum<nOver, the corresponding h3 bin is set to Hmax-k+dn(k+1)+1 and dNsum is incremented by 1. Whenever an h1 bin with level Hmax-k<=Ho is encountered and dNsum=nOver, the corresponding h3 bin is set to Hmax-k+dn(k+1) and dNsum is not incremented. This provides that all nPixTile tile pixels will be properly allocated to h3.

In some embodiments, adjusting the at least one image could include applying 526 at least one of: a shot noise filter (e.g., shot noise filter 166) or a sharpening filter (e.g., sharpening filter 168).

Method 500 may optionally include outputting 528 the at least one adjusted image among a series of image frames. In such a scenario, the image frames could be output at a frame rate of at least 59.94 frames per second or a frame rate suitable for high-definition video. Other frame rates are possible and contemplated.

Figure 6:
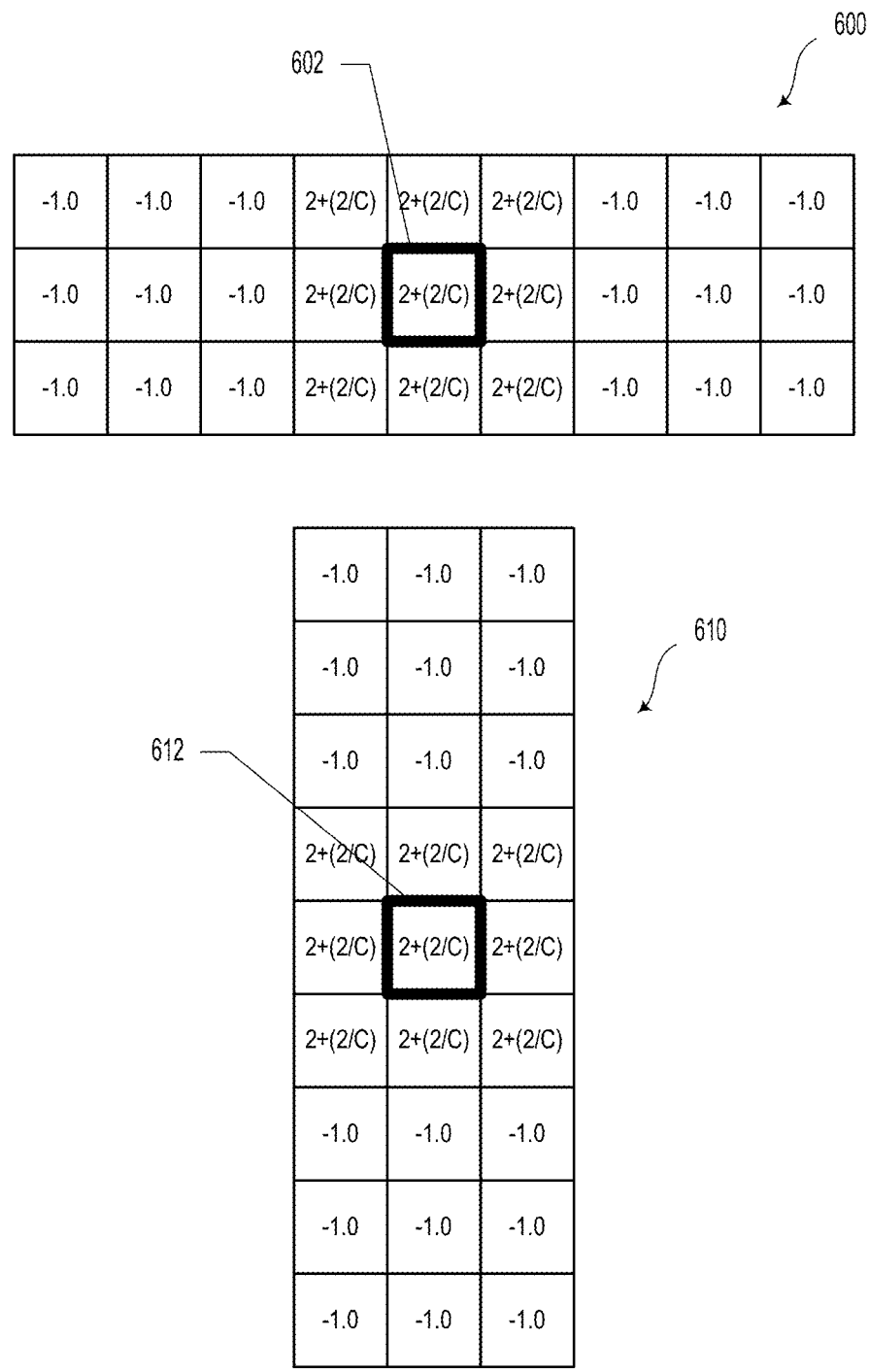
FIG. 6 illustrates unnormalized rectangular convolution kernels, according to an example implementation.

FIG. 6 illustrates unnormalized rectangular convolution kernels 600 and 610 of a local image contrast filter (e.g., local contrast filter 164), according to an example implementation. As illustrated, rectangular convolution kernel 600 could include a 3 row, 9 column convolution matrix that could be applied to a corresponding 3×9 pixel region in an image.

Correspondingly, the rectangular convolution kernel 610 could include a 9 row, 3 column convolution matrix that could be applied to a corresponding 9×3 pixel region in an image.

In some embodiments, rectangular convolution kernel 600 could be initially applied to a given 3×9 pixel region of the image. Subsequently, rectangular convolution kernel 610 could be applied to a 9×3 pixel region of the image that at least partially overlaps the initial 3×9 pixel region. The order of application of the rectangular convolution kernels 600 and 610 could be reversed or may vary. Furthermore, while 3×9 and 9×3 rectangular convolution kernels are illustrated, it will be understood that rectangular convolution kernels with different dimensions (e.g., 1×3, 5×15, 7×21, etc.) are possible and contemplated.

In an example embodiment, applying the rectangular convolution kernel 600 could include multiplying an intensity value of each pixel of the 3×9 pixel region by the corresponding entry of the rectangular convolution kernel 600 and taking the sum of the result of each multiplied entry. The sum could be adjusted (e.g., by multiplying the sum by the normalization factor C/18) and subsequently entered as the adjusted intensity value of the central pixel (e.g., the pixel corresponding with kernel entry 602) of the 3×9 pixel region.

Additionally, as described above, a 9×3 rectangular convolution kernel could be applied to a partially overlapping 9×3 pixel region of the image, which could share the same central pixel (e.g., the pixel corresponding to kernel entry 612). Similarly, an intensity value of each pixel of the 9×3 pixel region may be multiplied by the corresponding entry of the rectangular convolution kernel. The overall sum of the multiplied entries may be adjusted (e.g., normalized) by the normalization factor and the adjusted sum may be utilized as an adjusted intensity value of the central pixel of the 9×3 pixel region.

In this manner, the rectangular convolution kernel(s) can be applied to each pixel of the image to provide, at least in part, the adjusted image, which may have improved image contrast properties as compared to the as-captured image. In some embodiments, the rectangular convolution kernel(s) may be applied to a portion of the image based on an intensity of the central pixel, for example, being above or below a predetermined pixel intensity threshold. As an example, the local contrast filter could be selectively applied to dark or bright portions of the image. For example, the local contrast filter could be applied when a given pixel intensity value is less than 10% of the maximum intensity value and/or greater than 90% of the maximum intensity value. Other threshold intensity values are possible and contemplated.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

The description of the different advantageous arrangements has been presented for purposes of illustration and description, and is not intended to be exhaustive or limited to the examples in the form disclosed. Many modifications and variations will be apparent to those of ordinary skill in the art. Further, different advantageous examples may describe different advantages as compared to other advantageous examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method for processing images comprising:
 receiving, at a programmable circuit, at least one image; and
 adjusting the at least one image, by the programmable circuit, to provide at least one adjusted image, wherein adjusting the at least one image comprises applying:
  a local adaptive histogram equalization filter;
  a global gamma correction filter; and
  a local contrast filter,
 wherein applying the local contrast filter comprises:
  multiplying a rectangular convolution kernel by C/18, wherein C is a number between 1 to 2; and
  applying the rectangular convolution kernel to the at least one image.

2. The method of claim 1, wherein the programmable circuit is configured to execute a plurality of program instructions in a parallel pipelined process, wherein adjusting the at least one image comprises applying at least one of the local adaptive histogram equalization filter, the global gamma correction filter, or the local contrast filter by the parallel pipelined process.

3. The method of claim 2, wherein the parallel pipelined process comprises:
 during a histogram processing block, determining a clipped histogram corresponding to a given tile of a plurality of tiles of the at least one image; and
 during an accumulation block, determining a cumulative sum based on the clipped histogram.

4. The method of claim 1, wherein applying the local contrast filter comprises initially applying a rectangular convolution kernel along a first axis of the at least one image and subsequently applying the rectangular convolution kernel along a second axis of the at least one image, wherein the first axis and the second axis are perpendicular.

5. The method of claim 1,
 wherein the rectangular convolution kernel is:

| −1.0 | −1.0 | −1.0 | 2 + 2/C | 2 + 2/C | 2 + 2/C | −1.0 | −1.0 | −1.0 |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0. |

6. The method of claim 1, wherein applying the local adaptive histogram equalization filter comprises:
 partitioning the at least one image into a plurality of image tiles;
 performing a contrast-limited histogram equalization on each image tile;
 performing a bilinear interpolation for nearest neighbor tiles' contrast-limited histogram equalizations for each image pixel location; and
 using the bilinearly interpolated contrast-limited histogram equalization at each pixel location to remap an intensity value of the pixel at that location.

7. The method of claim 1, wherein adjusting the at least one image further comprises applying at least one of:
 a shot noise filter; or
 a sharpening filter.

8. The method of claim 1, further comprising:
 outputting the at least one adjusted image among a series of image frames, wherein the series of image frames are output at a frame rate of at least 59.94 frames per second or a frame rate suitable for high-definition video.

9. The method of claim 1, wherein the at least one image comprises an image pair, wherein the image pair comprises:
 a first image captured by a first camera; and
 a second image captured by a second camera, wherein the first camera and the second camera are configured to provide stereoscopic imagery.

10. An aerial refueling aircraft, comprising:
 a display;
 a programmable circuit configured to provide image data to the display, wherein the programmable circuit carries out operations, wherein the operations comprise:
  receiving, by the programmable circuit, at least one image; and
  adjusting the at least one image, by the programmable circuit, to provide at least one adjusted image, wherein adjusting the at least one image comprises applying:
   a local adaptive histogram equalization filter;
   a global gamma correction filter; and
   a local contrast filter, wherein applying the local contrast filter comprises:
    multiplying a rectangular convolution kernel by C/18, wherein C is a number between 1 to 2; and
    applying the rectangular convolution kernel to the at least one image.

11. The aerial refueling aircraft of claim 10, further comprising:
 at least one refueling boom;
 at least one camera;
 and an operator control interface, wherein the at least one camera is configured to provide the at least one image of the at least one refueling boom and a second aircraft, wherein the operator control interface is configured to cause at least one movement of the at least one refueling boom with respect to a fuel receptacle of the second aircraft.

12. The aerial refueling aircraft of claim 10, wherein applying the local contrast filter comprises applying a rectangular convolution kernel to a plurality of 3×9 and 9×3 pixel regions of the at least one image.

13. The aerial refueling aircraft of claim 10, wherein the programmable circuit is configured to execute a plurality of program instructions in a parallel pipelined process, wherein adjusting the at least one image comprises applying at least one of the local adaptive histogram equalization filter, the global gamma correction filter, or the local contrast filter by the parallel pipelined process.

14. The aerial refueling aircraft of claim 13, wherein the parallel pipelined process comprises:
 during a histogram processing block, determining a clipped histogram corresponding to a given tile of a plurality of tiles of the at least one image; and
 during an accumulation block, determining a cumulative sum based on the clipped histogram.

15. The aerial refueling aircraft of claim 10, further comprising:
 outputting the at least one adjusted image among a series of image frames, wherein the series of image frames are output at a frame rate of at least 59.94 frames per second or a frame rate suitable for high-definition video.

16. The aerial refueling aircraft of claim 10, wherein applying the local contrast filter comprises initially applying a rectangular convolution kernel along a first axis of the at least one image and subsequently applying the rectangular convolution kernel along a second axis of the at least one image, wherein the first axis and the second axis are perpendicular.

17. The aerial refueling aircraft of claim 10, wherein the rectangular convolution kernel is:

| | | | | | | | | |
|---|---|---|---|---|---|---|---|---|
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0 |
| −1.0 | −1.0 | −1.0 | 2 + 2/C | 2 + 2/C | 2 + 2/C | −1.0 | −1.0 | −1.0. |

18. An image processing device comprising:
a programmable circuit that is reprogrammed based on selected circuit data so as to construct a circuit configured to provide image processing on at least one image, wherein the image processing comprises:
receiving the at least one image;
adjusting the at least one image, to provide at least one adjusted image, wherein adjusting the at least one image comprises applying:
a local adaptive histogram equalization filter;
a global gamma correction filter; and
a local contrast filter, wherein applying the local contrast filter comprises:
multiplying a rectangular convolution kernel by C/18, wherein C is a number between 1 to 2; and
applying the rectangular convolution kernel to the at least one image.

19. The image processing device of claim 18, wherein the programmable circuit is configured to execute a parallel pipelined process, wherein adjusting the at least one image comprises applying at least one of the local adaptive histogram equalization filter, the global gamma correction filter, or the local contrast filter by the parallel pipelined process.

20. The image processing device of claim 19, wherein the parallel pipelined process comprises:
during a histogram processing block, determining a clipped histogram corresponding to a given tile of a plurality of tiles of the at least one image; and
during an accumulation block, determining a cumulative sum based on the clipped histogram.

* * * * *